United States Patent [19]

Kammer et al.

[11] Patent Number: 5,176,750

[45] Date of Patent: Jan. 5, 1993

[54] AZO PIGMENT COMPOSITIONS AND PROCESS FOR THEIR PREPARATION

[75] Inventors: Joseph Kammer, Warwick; Richard Fischer, Cumberland, both of R.I.

[73] Assignee: Hoechst Celanese Corporation, Somerville, N.J.

[21] Appl. No.: 800,790

[22] Filed: Nov. 27, 1991

[51] Int. Cl.$^5$ ............................................. C09B 41/00
[52] U.S. Cl. ................................. 106/496; 106/20 R; 106/499; 106/501; 534/573; 534/581
[58] Field of Search ................. 106/20, 496, 499, 501; 534/573, 581

[56] References Cited

U.S. PATENT DOCUMENTS

| | | | |
|---|---|---|---|
| 3,617,171 | 11/1971 | Ribka | 106/22 |
| 3,759,731 | 9/1973 | Kühne et al. | 106/22 |
| 3,775,148 | 11/1973 | Bradley | 106/496 |
| 4,341,701 | 7/1982 | Pechey et al. | 106/23 |
| 4,906,735 | 3/1990 | Hunger | 106/496 |
| 4,968,352 | 11/1990 | Keys et al. | 106/496 |

*Primary Examiner*—Mark L. Bell
*Assistant Examiner*—Helene Klemanski

[57] ABSTRACT

This invention is that of an azo pigment composition containing about 1 to 10 percent by weight of a nonionic alkyl polyglycoside dispersing agent. The polyglycosides useful in the invention have the general formulae:

$$C_nH_{2n+1}M\,(C_6H_{10}O_5)_x\,H$$

wherein: M is an oxygen, sulfur, nitrogen phosphorous or silicon atom; n is an integer from 8 to 18, preferably 8 to 11 and X represents the number average degree of polymerization having a numerical value from about 1 to about 2. These azo pigment compositions are prepared by conducting the azo pigment coupling reaction in the presence of said alkyl polyglycoside. The resulting pigment exhibit superior application properties in water based ink systems.

15 Claims, No Drawings

AZO PIGMENT COMPOSITIONS AND PROCESS FOR THEIR PREPARATION

BACKGROUND OF THE INVENTION

1. Technical Field

This invention is that of improved organic azo pigment compositions and processes for their preparation. The compositions of the invention have superior application properties including high gloss, improved transparency, high tinctorial strength and improved shade.

1. Background

Organic pigments are well known in the field of colorants. They are used in the coloring of printing inks, paints and plastics to impart a desired color in these articles. In addition, they find application to impart color to numerous other articles such as cosmetics, paper, leather, textile products etc.

An important class of organic pigments are the monoazo and disazo compounds derived from the coupling of compounds selected from the beta-naphthols, the arylides, and the pyrazolones with a diazonium salt or a bisdiazonium salt of a substituted or unsubstituted aromatic amine or diamine. The preparation of such azo pigments is well known. An aromatic amine is typically diazotized in a strongly acidic aqueous medium with nitrous acid to form a diazotized derivative. The diazotized derivative is further reacted with a second molecule, a coupling component, to form the azo pigment. Numerous patents are available which describe the preparation of monoazo and disazo organic pigments; see e.g. U.S. Pat. Nos. 2,431,889; 3,617,171; 3,759,731; 3,775,148; 3,776,749; 4,341,701 and 4,968,352, the teachings of which are hereby incorporated by reference.

In addition to the chemical structure, the physical form of the pigment greatly influences its properties. Process conditions are controlled in the manufacturing process to influence such properties as crystalline form, particle size and particle size distribution to effect optimum dispersibility, tinctorial strength, gloss, transparency, shade and other properties.

It is also known in the art to add surface active agents to the coupling reaction to effect improved properties; see e.g. U.S. Pat. No. 4,968,352 at column 7. It is the object of this invention to produce improved pigment compositions having superior properties by the use of nonionic polyglycoside surface active agents. The pigment compositions of this invention exhibit unexpectedly superior application properties in ink systems; e.g. improved gloss, transparency, tinctorial strength and brightness.

SUMMARY OF THE INVENTION

This invention is directed to new azo pigment compositions and methods of preparing such compositions. The pigment compositions of this invention are prepared by forming a suspension of an azo pigment in an aqueous medium containing an alkyl polyglycoside surface active agent. The alkyl polyglycosides useful in the invention may be represented by the general formulae, $C_n H_{2n+1} M(C_6H_{10}O_5)_x H$ wherein x is a number having value from about 1 to about 2, and n is an integer from about 8 to 18 preferably about 8 to 11. The moiety, M is O, S, N, P or Si. The compositions of the invention may be prepared by conducting the pigment coupling reaction in the presence of about 1 to 10 percent by weight of said alkyl polyglycoside, preferably about 2 to 6 percent by weight based upon the weight of pigment formed in the coupling. The resulting pigments exhibit unexpectedly superior improved application properties, i.e. increased transparency, increased gloss and 10 to 40% higher tinctorial strength in water based ink systems.

DESCRIPTION OF THE PREFERRED EMBODIMENTS

The invention is directed to improved pigment compositions of the monoazo and disazo series, printing inks prepared from said pigment compositions and articles colored or printed with such pigments.

The compositions of this invention comprise azo organic pigments containing from about 1 to about 10 percent by weight, preferably about 2 to 6 percent by weight of an alkyl polyglycoside of the general formula:

$$C_n H_{2n+1} M(C_6H_{10}O_5)_x H$$

wherein:
(a) x is a number having a value from about 1 to about 2;
(b) n is an integer from about 8 to about 18; preferably about 8 to about 11; and
(c) the moiety M represents an element selected from O, S, N, P or Si; preferably M is O or S.

Alkyl polyglycosides are well known in the art and are commercially available from Harcros Chemical Inc., Kansas City, Kans. (A subsidiary of Henkel Corporation) under the product name APG ® Glycosides. These alkyl polyglycosides (M=O) may be prepared by reaction of sugar with an alcohol in an acidic reaction medium. The numerical value of x represents the average number of ($C_6H_{10}O_5$) units in the alkyl polyglycoside composition. A proportion of the alkyl polyglycoside molecules may have a greater number of the ($C_6H_{10}O_5$) units and a proportion may have a lesser number than the average value x. This terminology is readily understood by those skilled in the art and is employed in this specification consistent with this meaning. Similarly, commercially available natural and synthetic alcohols usually are a mixture of different chain length e.g. C8 to C10, C12 to C14 (both synthetic and natural) or C9 to C11 (oxo synthetics). The following table lists the values for the alkyl chain length (number of carbons-n) and the value of x in several of the commercially available Harcros APG ® Glycoside products.

| APG ® Products | Carbon Chain | X |
| --- | --- | --- |
| 225 | 8–10 | 1.8 |
| 300 | 9–11 | 1.4 |
| 325 | 9–11 | 1.6 |
| 500 | 12–13 | 1.4 |
| 550 | 12–13 | 1.8 |
| 600SP | 12–14 | 1.4 |
| 600 | 12–14–16 | 1.4 |
| 625 | 12–14–16 | 1.6 |

The diazotization and coupling of the amines and coupler used in the preparation of pigments are conducted in the normal manner. The alkyl polyglycoside represented by the above formulae may be incorporated into the azo pigment composition of the invention in a number of ways;

(a) prior to coupling by dissolving it in the coupler solution or diazonium solution or both;

(b) by adding it to the coupling reaction during the addition of the coupler to the diazonium or bisdiazonium component (c) by adding it to the reaction mixture after addition of the coupler Infrared analysis of the final pigment compositions shows that even when the polyglycoside is added to the reactants and the resulting pigment is isolated and washed, substantially all (in the order of about 90%) of the water soluble polyglycoside remains in the pigment composition.

Other additives normally used in azo pigment manufacture may be incorporated into the azo pigment composition of this invention; e.g. amines, extenders, other surfactants. The process may be carried out in the presence of a carrier material, for example barite. In addition, after coupling the reaction may be heat treated, the moist presscake or dried powder may also be subjected to thermal after treatment and if appropriate in the presence of an organic solvent. The pigments of the invention are washed, dried and ground in the usual manner, optionally with the addition of grinding auxiliaries.

The monoazo and disazo pigments to which the invention is directed may be represented by the following formulae:

Monoazo Pigment A—N=N—B; and

Disazo Pigment A—N=N—C—N=N—A

The moiety A may be derived from a substituted or unsubstituted arylide, a substituted or unsubstituted pryazolone or substituted or unsubstituted naphthol; preferably A is derived from a naphthol. B is a substituted or unsubstituted phenyl or naphthol group and C is a substituted or unsubstituted diphenylene or bis phenylene group.

The moiety, A may be an arylide of the general formulae:

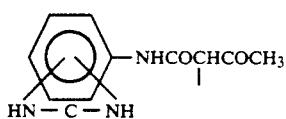

or

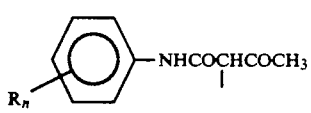

wherein: n is an integer equal to 1 to 3. R is hydrogen, an alkyl of one to four carbons, an alkoxy of one to four carbons, halogen (Cl, Br, I, F), —NO₂, —SO₃X wherein X is hydrogen, sodium, calcium, strontium, barium, magnesium, aluminum and manganese; —CONH Y wherein Y is hydrogen or a substituted or unsubstituted phenyl wherein said substituent is an alkyl of one to four carbons, an alkoxy of one to four carbons, halogen, —SO₃X wherein X is defined above or —COOX wherein X is defined above or —CONH₂.

The moiety, A may also be a substituted or unsubstituted pryazolone of the formula:

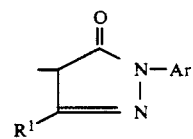

wherein Ar is a substituted or unsubstituted phenyl wherein said substituent is alkyl of one to four carbons or SO₃X where in X is defined above. $R^1$ is —COOX₁ wherein X₁ is an alkyl of one to four carbons or $R^1$ is hydrogen or alkyl of one to four carbon. A, may also be a naphthol of the formula:

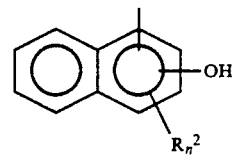

wherein $R^2$ is hydrogen, alkyl of 1 to 4 carbons, alkoxyl of 1 to 4 carbons, —COOX wherein X is defined above; —SO₃X wherein X is defined above, —NO₂, halogen and —CONHR³ wherein $R^3$ is hydrogen, phenyl or substituted phenyl wherein said phenyl substituent is $R_n$ wherein R and n are defined above. The substituent $R^2$ may be located on either ring of the naphthol moiety or on both when n is greater than 1.

B is represented by the formula:

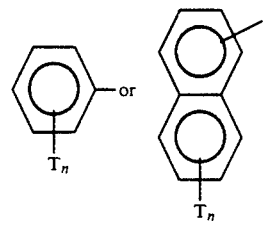

wherein T is R as defined above and n is 1 to 3. T may also be:

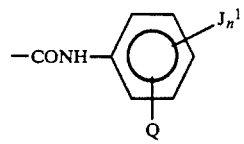

wherein J is alkyl or alkoxyl of 1 to 4 carbons or hydrogen and $n^1$ is 1 or 2. Q is —CONH₂ or —CONH—Ar—J; wherein J and Ar are defined above.

C is represented by the formula:

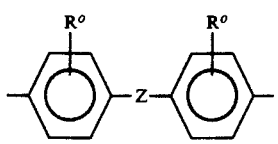

wherein Z is bond or —CONH—, and $R^o$ is hydrogen, halogen, alkyl or alkoxy of 1 to 4 carbon or —SO₃X wherein X is defined above.

Exemplary examples of coupling components within the above described formulae are:

When A is derived from an arylide:
Acetoacetylamino-benzene,
2-acetoacetylamino-toluene,
4-acetoacetylamino-toluene,
2-acetoacetylamino-anisol,
4-acetoacetylamino-anisol,
2-acetoacetylamino-phenetitide,
4-acetoacetylaminophenetitide,
1-acetoacetylamino-2,4-dimethylbenzene,
1-acetoacetylamino-2,4-dimethoxybenzene,
1-acetoacetylamino-2,5-dimethoxybenzene,
1-acetoacetylamino-2,4-dichlorobenzene,
1-acetoacetylamino-2,5-dimethoxy-4-chlorobenzene,
5-chloro-2-acetoacetylamino-toluene
3-chloro-4-acetoacetylamino-toluene,
1-acetoacetylamino-naphthalene,
2-acetoacetylamino-naphthalene.

When A is derived from a naphthol:
2-naphthol,
2-hydroxy-3-naphthoic acid,
3-hydroxy-2-naphthanilide,
6-bromo-2-hydroxy-3-naphthoic acid,
2-naphthol-5-sulfonic acid,
4'-acetamido-3-hydroxy-2-napthanilide,
3-hydroxy-3'-nitro-2-naphthanilide,
2'-ethoxy-3-hydroxy-2-naphthanilide,
2-naphthol-3,7-disulfonic acid,
2'methoxy-3-hydroxy-2-napthanilide,
3'-nitro-3-hydroxy-2-naphthanilide,
3-hydroxy-2-naphtho-o-toluidide,
2'-methyl-5-chloro-3-hydroxy-2-naphthanilide,
2'-methyl-3-hydroxy-2-naphthanilide,
1-naphthol-3,7-disulfonic acid,
3-hydroxy-N-2-naphthyl-2-naphthamide, and
4'-chloro-3-hydroxy-2-naphthanilide.

When A is derived from a pyrazolone:
3-methyl-1-phenyl-pyrazolone-(5),
3-methyl-1-(3'-sulfophenyl)-pyrazolone-(5),
3-methyl-1-(4'-sulfophenyl)-pyrazolone-(5),
3-carbethoxy-1-phenyl-pyrazoline-(5),
3-methyl-1-(4'-carboxyphenyl)-pyrazolone-(5),
3-methyl-1-(2'-chloro-4'-sulfophenyl)-pyrazolone-(5),
3-methyl-1-(2',5'-dichloro-4'-sulfophenyl)-pyrazolone-(5),
3-methyl-1-(6'-chloro-2'-methyl-4'-sulfophenyl)pyrazolone-(5),
1-phenyl-3-carboxy-pyrazolone-(5), and
1-(4'-sulfophenyl)-3-carboxy-pyrazolone-(5).
3-methyl-1-p-tolyl-pyrazolone-(5).

Exemplary amines and diamines useful in the invention are:
2,5-dichloroaniline
2,4-dinitroaniline
2-nitro-4-methylaniline
3,3'-dichlorobenzidine
3,3'-dimethoxybenzidine
3-amino-4-chlorobenzamide
2-amino-5-chloro-4-ethylbenzene sulfonic acid
4-chloro-6-amino-m-toluene sulfonic acid
2-amino-1-naphthalene sulfonic acid
3-chloro-6-amino-4-methylbenzene-sulfonic acid
2-amino-5-methylbenzene sulfonic acid
2-methoxy-5-nitro-aniline
5-aminoisophthalic acid dimethyl ester
2-aminobenzoic acid
2-trifluoromethylaniline
3-amino-4-methoxybenzanilide Exemplary pigments useful in the invention are:
CI Pigment Orange 5
diazotized 2,4-dinitroaniline coupled with 2-naphthol
CI Pigment Orange 6
diazotized 2-nitro-4-methylaniline coupled with 3-methyl-1-phenyl-5-pryazolone
CI Pigment Orange 7
diazotized 2-amino-4,5-dichlorobenzene sulfonic acid coupled with 2-naphthol and converted to the sodium salt
CI Pigment Orange 38
diazotized 3-amino-4-chlorobenzamide coupled with 4-acetamido-3-hydroxy-2-naphthanilide
CI Pigment Orange 46
diazotized 2-amino-5-chloro-4-ethylbenzene sulfonic acid coupled with 2-naphthol and converted to the barium salt
CI Pigment Orange 13
bisdiazotized 3,3'-dichlorobenzidine coupled with 3-methyl-1-phenyl-5-pyrazolone (2 moles)
CI Pigment Orange 34
bisdiazotized 3,3'-dichlorobenzidine coupled with 3-methyl-1-p-tolyl-5-pyrazolone (2 moles)
CI Pigment Yellow 12
bisdiazotized 3,3'-dichlorobenzidine coupled with acetoacetanilide (2 moles)
CI Pigment Yellow 13
bisdiazotized 3,3'-dichlorobenzidine coupled with acetoacet-m-xylidide (2 moles)
CI Pigment Yellow 14
bisdiazotized 3,3'-dichlorobenzidine coupled with acetoacet-o-toluidide (2 moles)
CI Pigment Yellow 17
bisdiazotized 3,3'-dichlorobenzidine coupled with acetoacet-o-anisidide (2 moles)
CI Pigment Yellow 74
diazotized 2-methoxy-4-nitroaniline coupled with acetoacet-o-anisidide
CI Pigment Yellow 120
diazotized 5-aminoisophthalic acid dimethyl ester coupled with N-(2-oxo-5-benzimidazolinyl) acetoacetamide
CI Pigment Yellow 151
diazotized 2-aminobenzoic acid coupled with an acetoacetyl derivative of 5-aminobenzimidazolone
CI Pigment Red 2
diazotized 2,5-dichloroaniline coupled with Naphtol AS, (3-hydroxy-2-naphthanilide)
CI Pigment Red 22
diazotized 2-methyl-5-nitroaniline coupled with Naphtol AS, (3-hydroxy-2-naphthanilide)
CI Pigment Red 23
diazotized 5-nitro-o-anisidine coupled with 3-hydroxy-3'-nitro-2-naphthanilide
CI Pigment Red 38
bisdiazotized 3,3'dichlorobenzidine coupled with 3-carbethoxy-1-phenyl-5-pyrazolone (2 moles)
CI Pigment Red 48
diazotized 4-chloro-6-amino-m-toluenesulfonic acid coupled with 3-hydroxy 2-naphthoic acid and converted to barium salt or calcium salt or strontium salt or manganese salt
CI Pigment Red 49
diazotized Tobias acid coupled with 2-naphthol and converted to the barium salt or calcium salt or strontium salt or manganese salt
CI Pigment Red 53 diazotized 2-amino-5-chloro-4-methyl-benzenesulfonic acid coupled with 2-naphthol and converted to the barium salt or calcium salt or strontium salt or manganese salt.

CI Pigment Red 146
diazotized anisbase, (3-amino-4-methoxybenzanilide coupled with 4'-chloro-3-hydroxy-2,5'-dimethoxy-2-naphthanilide.

CI Pigment Red 147
diazotized anisbase (3-amino-4-methoxybenzanilide) coupled with 2-methyl-5-chloro-3-hydroxy-2-naphthanilide.

CI Pigment Red 200
diazotized 2-amino-5-chloro-4-ethylbenzenesulfonic acid coupled with 3-hydroxy-2-naphthoic acid and converted to the calcium salt The application properties of the pigments evaluated in this description were conducted in a water based flexo ink. The test ink was prepared by dispersing the pigment in a water based binder solution containing 52.3% water, 10% isopropanol, 7.7% ammonia 28% and 30% of a styreneacrylic acid copolymer (Joncryl 67 Resin). The dispersion consisted of 15 parts pigment: 45 parts water: 40 parts of binder solution.

The shade, transparency and gloss properties were conducted on an ink prepared from the above dispersion diluted to a 10% pigment content with additional binder solution (2 parts dispersion : 1 part of binder solution). Draw downs of the 10% pigment content ink were made on coated stock using a #4 wire wound applicator.

Tinctorial strength was measured on draw downs using a #4 wire wound applicator of one part of the above described dispersion (15% pigment content) dispersed in 10 parts a titanium dioxide dispersion—(40 parts water based under solution: 20 parts of water 40 parts of titanium dioxide. The tinctorial strength and shade results were read using an ACS Chroma Sensor CS5 color spectrophotometer with a computer assisted software package Chroma QC available from ACS DATACOLOR, Princeton, N.J. Gloss reading were determined at 60° angle of reflection using a BYK-Gardner "Pocketgloss" gloss-meter available from BYK-Gardner, a subsidiary of BYK Chemie, U.S., Englewood, N.J.

In the reported test value the following visual difference rankings were used; 1 or trace, 2 or slight, 3 or distinct, 4 or considerable and 5 or much difference from the standard. A negative value indicates inferiority to the standard and positive value indicates superiority.

The following examples illustrate the invention but should not be construed to limit its scope and are merely intended as illustrations of the present invention.

EXAMPLE 1

CI Pigment Red 2

18.2 parts of 2,5-dichloroaniline (100%) are mixed with 44.4 parts of 31% hydrochloric acid and 15 ml of water for one hour. The solution is diluted and cooled to 0° C. with 130 parts of water and 170 parts of ice and then 19.5 parts of sodium nitrite solution (40%) are added subsurface over one minute. A slight excess nitrite concentration is maintained at a temperature of less than 10° C. for one hour. The excess nitrite is destroyed with sulfamic acid and 5.8 parts of glacial acetic acid, 1 part of filter aid is added. The solution is filtered and the volume is adjusted to 600 ml and the temperature held at less than 10° C. 2.1 parts of APG ® 225 Glycoside 70% solution are added to the clarified diazo solutions to which is added a clarified solution of 30.6 parts of Naphthol AS (3-hydroxy-2-naphthanilide) and 4.8 parts of a aqueous base soluble resin and 10.0 parts of sodium hydroxide in 770 parts of water over 2 hours. The temperature is maintained at 10L 15° C. and the pH is 3–4 after the addition is completed. Thereafter the solution is heated to 40° C. and 5.8 parts of sodium acetate are added to it and the pH is 4.0–4.5. The solution is heated to 90° C. and stirred at 90° C. for 30 minutes and filtered. The pigment is washed and dried at 100° C. to yield about 55 parts of dried pigment and pulverized.

The product provides a water flexo ink which is much more transparent, much yellower in printtone, considerably glossy, 29 parts stronger, distinctly yellow in tint shade than a test ink prepared from a lab control batch of CI Pigment Red 2 made without the polyglycoside.

EXAMPLE 2

CI Pigment Red 22

P-nitro-o-toluidine (2-methyl-5-nitroaniline), 15.1 parts, 32.2 parts of 31% hydrochloric acid and 125 parts of water are mixed for 30 minutes to form a slurry which is cooled with ice to 0° to −5° C. 17.4 parts of sodium nitrite 40% solution are added subsurface over one minute to this solution. A slight excess nitrite concentration is maintained at <10° C. for 30 minutes. Excess nitrite is destroyed with sulfamic acid. Glacial acetic acid 5.2 parts and 1 part filter aid are added to the diazotized aniline solution which is then filtered. The solution volume is adjusted to 400 ml and the temperature is adjusted to 400 ml and 10° C. 2.1 g of APG ® 225 Glycoside 70% solution is added to the clarified diazo and a clarified solution of 28.2 parts of Naphthol AS (3-hydroxy-2-naphthanilide), 4.3 parts of aqueous base soluble resin, 10.0 parts of sodium hydroxide in 525 parts of water is added over one hour. The pH is 4.5–5.0 and the solution is heated to 90° C. under agitation and held at 90° C. for 30 minutes. The pigment is recovered by filtration washed and dried at 115° C. The dry pigment is pulverized to yield about 45 parts of pigment.

The product gives a water based flexo ink which is much more transparent, distinctly blue in printtone, considerably higher gloss, 25 parts stronger and distinctly blue in tint shade when compared to an ink prepared from a pigment made without the glycoside.

EXAMPLE 3

CI Pigment Red 2

A solution of diazotized amine was prepared as set forth in Example 1. To the clarified diazo solution was added a solution of 1 part I-S-Octyl-β-D-glucopyranoside in 10 parts water. The temperature adjusted to 40° C. and the coupling was made as in Example 1. After the coupling was completed, 5.8 parts of sodium acetate were added and the pH was adjusted to 8.5 with 30 parts of sodium hydroxide as 15% solution and 4.0 parts of calcium chloride dihydrate in 50 parts of water were added. The reaction product was held 90° C. for 30 minutes. The pigment was recovered by filtration, washed and dried at 110° C. to yield about 55 parts of dry pigment which was pulverized.

This pigment was made into a water based ink which was considerably more transparent, much yellower in printtone, much glossier, 15 parts strong and much brighter when compared to a ink prepared from a CI Pigment Red 2 pigment made without the glycoside.

EXAMPLE 4

CI Pigment Yellow 74

C.I. Pigment Yellow 74 was prepared by dissolving 16.8 parts of 2-methoxy-4-nitroaniline (100%) in 36 parts of water (by weight) and 30.3 parts of 31% hydrochloric acid by stirring for one hour. This mixture was cooled to 0 to 5° C. with ice and then 17.7 parts of 40% sodium nitrite solution was added to the solution (subsurface) over 15-20 minutes. Excess nitrite was maintained for one hour at a temperature less than 10° C. Excess nitrite was then destroyed with sulfamic acid. One part of filter aid was added to the reaction mixture and the solution was filtered. 1.65 parts of a 70% solution of APG ® 225 Glycoside were added to the filtered solution. In a separate beaker, 21.7 parts of acetoacetylated-2-methoxyanilide (AAOA) is stirred with 13.4 parts of 50% sodium hydroxide solution and 300 parts of water at room temperature until it is completely dissolved. 0.2 parts of sodium lauryl sulfate dissolved in 10 parts of water and 1.65 parts of 70% solution of APG ®-225 Glycoside in 10 parts of water are added to the AAOA solution. This AAOA solution is adjusted to 15° C and the AAOA is then precipitated by the rapid addition of 11.5 parts of glacial acetic acid and then 4.0 parts of aqueous base soluble resin dissolved in 2.0 parts of 50% sodium hydroxide solution and 50 parts of water are added over 10-15 minutes. The temperature is adjusted to 18° C. and the diazo component (solution 1) is added subsurface to the coupling component over 1.5-2 hours. The resulting pigment slurry is heated to 80° C. with internal steam for one hour and then cooled to 70° C. with cold tap water. The slurry is filtered and washed to obtain a pigment presscake which is dried at 105° C. for 3-4 hours to yield about 41 parts of dry pigment (C.I. Pigment Yellow 74).

This pigment was pulverized and compared to a C.I. Pigment Yellow 74 (which was coupled in the presence of sodium lauryl sulfate) in water base flexo ink on coated stock and found to be considerably more glossy, distinctly brighter and greener in shade, and 10 parts stronger in tinctorial strength but the transparency was distinctly less.

EXAMPLE 5

CI Pigment Red 147

17.3 parts of anisbase, (3-amino-4-methoxy benzanilide are dissolved in 28.3 parts of 31% hydrochloric acid and 200 parts of water at 10° C. 12.1 parts of sodium nitrite 40% solution are added subsurface over 3-5 minutes. A positive nitrite test was maintained in the solution at 10°-15° C. for 30 minutes. Excess nitrite was destroyed with sulfamic acid. 3.65 parts acetic acid is added and the temperature adjusted to 40° C. The solution was filtered and 1.58 parts of APG ® 225 Glycoside 70% solution in 10 parts of water are added to the filtered diazo. The coupling solution is made by adding 25.25 parts of Naphthol AS-KB (2-naphthalene carboxamide, 3-hydroxy-N-(5-chloro-2-methyl phenyl)—and 3.70 parts of a resin dissolved in 6.25 parts of sodium hydroxide and 350 parts of water over two hours. The reaction mixture is heated to 90° C. and held at 90° C. for 15 minutes. The pigment is recovered, washed and dried at 110° C. to yield 45 parts of dry pigment which is pulverized.

The product of this example gives a water based flexo ink which is much more transparent, much brighter in printtone, much glossier, 15 parts strong and much brighter when compared to a test ink made from a pigment made without the Glycoside.

We claim:

1. An azo pigment composition comprising an azo pigment selected from the monoazo and disazo pigments and from about 1 to 10 percent by weight of an alkyl polyglycoside of the formula:

$$C_nH_{2n+1} M(C_6H_{10}O_5)_x H$$

wherein:

x is a number having a value from about 1 to about 2;
n is an integer from about 8 to about 18; and
M is a moiety selected from O, S, N, P and Si.

2. A composition according to claim 1 wherein M is selected from O and S.

3. A composition according to claim 2 wherein said alkyl polyglycoside is present in an amount from about 2 to about 6 percent.

4. A composition according to claim 3 wherein n is an integer from about 8 to about 11.

5. A composition according to claim 3 wherein n is an integer from about 12-16.

6. A process for preparing an azo pigment which comprises coupling a diazotized amine with a coupling component selected from a substituted or unsubstituted arylide, naphthol or pyrazolone in the presence of 1 to 10 percent by weight of pigment produced of an alkyl polyglycoside of the formula:

$$C_nH_{2n+1} M(C_6H_{10}O_5)_x H$$

wherein:

x is a number having a value from about 1 to about 2;
n is an integer from about 8 to about 18; and
M is a moiety selected from O, S, N, P and Si.

7. A process according to claim 6 wherein M is selected from O and S.

8. A process according to claim 7 wherein said alkyl polyglycoside is present in an amount from about 2 to about 6 percent.

9. A process according to claim 8 wherein n is an integer from about 8 to about 11.

10. A process according to claim 8 wherein n is an integer from about 12 to about 16.

11. A water based ink composition comprising a aqueous binder solution and an azo pigment selected from the monoazo and disazo pigments and from about 1 to 10 percent by weight of an alkyl polyglycoside of the formula:

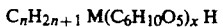

$$C_nH_{2n+1} M(C_6H_{10}O_5)_x H$$

wherein:

x is a number having a value from about 1 to about 2;
n is an integer from about 8 to about 18; and
M is a moiety selected from O, S, N, P and Si.

12. A water based ink composition according to claim 11 wherein M is selected from O and S.

13. A water based ink composition according to claim 12 wherein said alkyl polyglycoside is present in an amount from about 2 to about 6 percent.

14. A water based ink composition according to claim 13 wherein n is an integer from about 8 to about 11.

15. A water based ink composition according to claim 13 wherein n is an integer from about 12 to about 16.

* * * * *